USO05566960A

United States Patent [19]
McCrory

[11] Patent Number: 5,566,960
[45] Date of Patent: Oct. 22, 1996

[54] OUTBOARD MOTOR CADDY

[76] Inventor: Dennis McCrory, 211 E. 170th St., Spanaway, Wash. 98387

[21] Appl. No.: 255,397

[22] Filed: Jun. 8, 1994

[51] Int. Cl.⁶ .................................................. B62B 3/00
[52] U.S. Cl. ................... 280/47.35; 280/DIG. 2; 280/79.11
[58] Field of Search .................. 280/DIG. 2, 79.2, 280/79.3, 47.35, 47.131, 79.11; 224/922

[56] References Cited

U.S. PATENT DOCUMENTS

| | | | |
|---|---|---|---|
| D. 224,423 | 12/1991 | Greenberg | D 12/317 |
| 503,105 | 8/1893 | Tingley | 280/79.3 |
| 2,380,017 | 7/1945 | Blicker | 312/146 |
| 2,515,428 | 7/1950 | Scott et al. | 206/46 |
| 2,620,812 | 12/1952 | Kiefer | 134/182 |
| 2,843,393 | 7/1958 | Dahlander, Sr. | 280/DIG. 2 |
| 2,860,887 | 11/1958 | Stewart | 280/DIG. 2 |
| 2,901,261 | 8/1959 | Olvey | 280/DIG. 2 |
| 2,903,147 | 9/1959 | Davis | 280/DIG. 2 |
| 2,916,292 | 12/1959 | Olson | 280/47.13 |
| 2,983,520 | 5/1961 | Klages | 280/DIG. 2 |
| 3,059,784 | 11/1962 | Chamberlain et al. | 280/DIG. 2 |
| 4,136,806 | 1/1979 | Wisz | 224/42.45 |
| 4,871,099 | 10/1989 | Bogar | 224/922 |
| 5,035,437 | 7/1991 | Woodward | 280/47.131 |
| 5,123,803 | 6/1992 | Crabtree | 280/DIG. 2 |
| 5,340,135 | 8/1994 | Womberly | 280/47.19 |
| 5,378,004 | 1/1995 | Gunlock et al. | 280/47.2 |

FOREIGN PATENT DOCUMENTS

| | | | |
|---|---|---|---|
| 452544 | 11/1948 | Canada | 280/DIG. 2 |
| 1136689 | 5/1957 | France | 280/79.3 |
| 1286337 | 1/1962 | France | 280/DIG. 2 |

Primary Examiner—Eric D. Culbreth
Assistant Examiner—Min S. Yu
Attorney, Agent, or Firm—R. Reams Goodloe, Jr.

[57] ABSTRACT

A storage and carriage stand for an outboard motor. The stand has a wheeled base constructed of opposing elongate side portions and a transversely positioned interior end portion which extends between the side portions tubular steel members. The base members support a frame which includes opposed upright members which are interconnected by a transversely positioned and vertically disposed generally planar shaped transom, to which an outboard motor may be securely affixed. The transport stand base is generally U-shaped so as to include an open end, with the open end being of sufficient width to allow a selected outboard motor which is being attached to said stand to freely pass between said opposing elongate side portions until said transom is reached by the outboard motor.

13 Claims, 5 Drawing Sheets

OUTBOARD MOTOR CADDY

FIELD OF THE INVENTION

This invention relates to devices to support outboard motors, and more particularly to a novel stand which is adapted to hold outboard motors and other boating gear during local transport and storage.

BACKGROUND

Outboard motors are commonly used for powering small to medium size boats. Often, during servicing or storage of such boats and/or their motors, it becomes necessary to remove the outboard motor from the boat and to move the outboard motor to a convenient storage location. At such times, it also is necessary to handle, transport, and store related equipment, such as a gasoline tank and fishing gear.

Since outboard motors are heavy to lift and awkward to carry, a variety of devices have heretofore been proposed to assist in their carriage. One development which upon first impression superficially resembles the instant invention is U.S. Pat. No. 2,380,017 issued Jul. 10, 1945 to Blicker for PORTABLE OUTBOARD MOTOR STAND, which discloses a truck type frame with an upstanding frame attached to the truck body. However, that patent discloses and claims a stand in which a frame is substantially directly over one of the pairs of truck wheels. Although the frame is inclined toward the center of gravity of the truck, the stand does not provide the degree of stability which I consider desirable in view of the rather substantial weight of most outboard motors. Other patents in the area include the following: U.S. Pat. No. 2,515,428 issued Jul. 18, 1950 to Scott for OUTBOARD MOTOR SUPPORT AND PACKAGE which provides a stationary stand for holding an outboard motor in either an upright vertical or in an inverted position; U.S. Pat. No. 2,620,812 issued Dec. 9, 1952 to Kiefer for BOAT MOTOR FLUSHING TANK AND HANGER which provides a tank on wheels and a frame for supporting an outboard motor in a position to operatively extend down into the tank; and U.S. Pat. No. 2,916,292 issued Dec. 8, 1959 to Olson for OUTBOARD MOTOR STAND AND DOLLY which discloses a simple transportable dolly type frame or stand which is configured to allow pivotal movement of a motor clamp while the motor is held by the dolly.

In conclusion, while there are a wide variety of carriers for outboard motors, in so far as I am aware, most of the available devices to some greater or lesser degree have inherent stability problems. Also, the previous outboard motor stands were not engineered with storage availability for related equipment, such as fishing rods and tackle boxes. The problems and disadvantages just described are virtually eliminated by the present invention.

SUMMARY

I have now invented, and disclose herein, a novel outboard motor stand which allows stable carriage of an outboard motor while simultaneously providing for storage of related equipment. It is like those stands heretofore proposed in that it provides a four wheel truck portion. However, my novel outboard motor transport stand varies from those heretofore proposed in that a U-shaped base is provided with an upright frame member is located near the center of the truck portion. Also, the frame member includes substantial storage space for related equipment, such as gas tanks or tackle boxes. The truck portion also includes stands for fishing rods. Therefore, all equipment related to boating can be easily stored in my outboard motor transport stand, ready for easy removal of such equipment to or from a boat.

In one embodiment of my invention, a four wheeled, U-shaped base having opposite sides is provided with two sides and an end. A frame is centrally disposed between the two sides. The frame has two opposing, upright members, and each of the members has a bottom end which is affixed to one of the sides of the U-shaped base. A vertically disposed transom portion extends transversely between the upright members. The transom portion is suitable for receiving and clamping thereto an outboard motor, at the side of the transom portion toward the open end of the U-shaped base. One or more horizontal, transversely disposed storage shelves may be provided between the opposing upright frame members.

OBJECTS, ADVANTAGES AND FEATURES OF THE INVENTION

From the foregoing, it will be evident to the reader that the primary object of the present invention resides in the provision of a novel outboard motor carrier with integral storage rack and rod holder.

It is a further object of the present invention to provide an outboard motor transport stand:

which provides a compact and organized storage rack for an outboard motor and related boating equipment;

which minimizes the likelihood of upset of the stand and accompanying outboard motor.

Other important objects, features and additional advantages of the invention will be apparent to the reader from the foregoing and the appended claims and as the ensuing detailed description and discussion of the invention proceeds in conjunction with the accompanying drawing.

BRIEF DESCRIPTION OF THE DRAWING

The novel features that are considered characteristic of the invention are set forth with particularity in the appended claims. The invention, however, together with additional objects and advantages thereof, will be best understood from the following description when read in connection with the accompanying drawings in which:

In the several figures, like parts will be noted with like reference numerals, without the necessity of repeated description of the same.

DESCRIPTION

Figure 1:
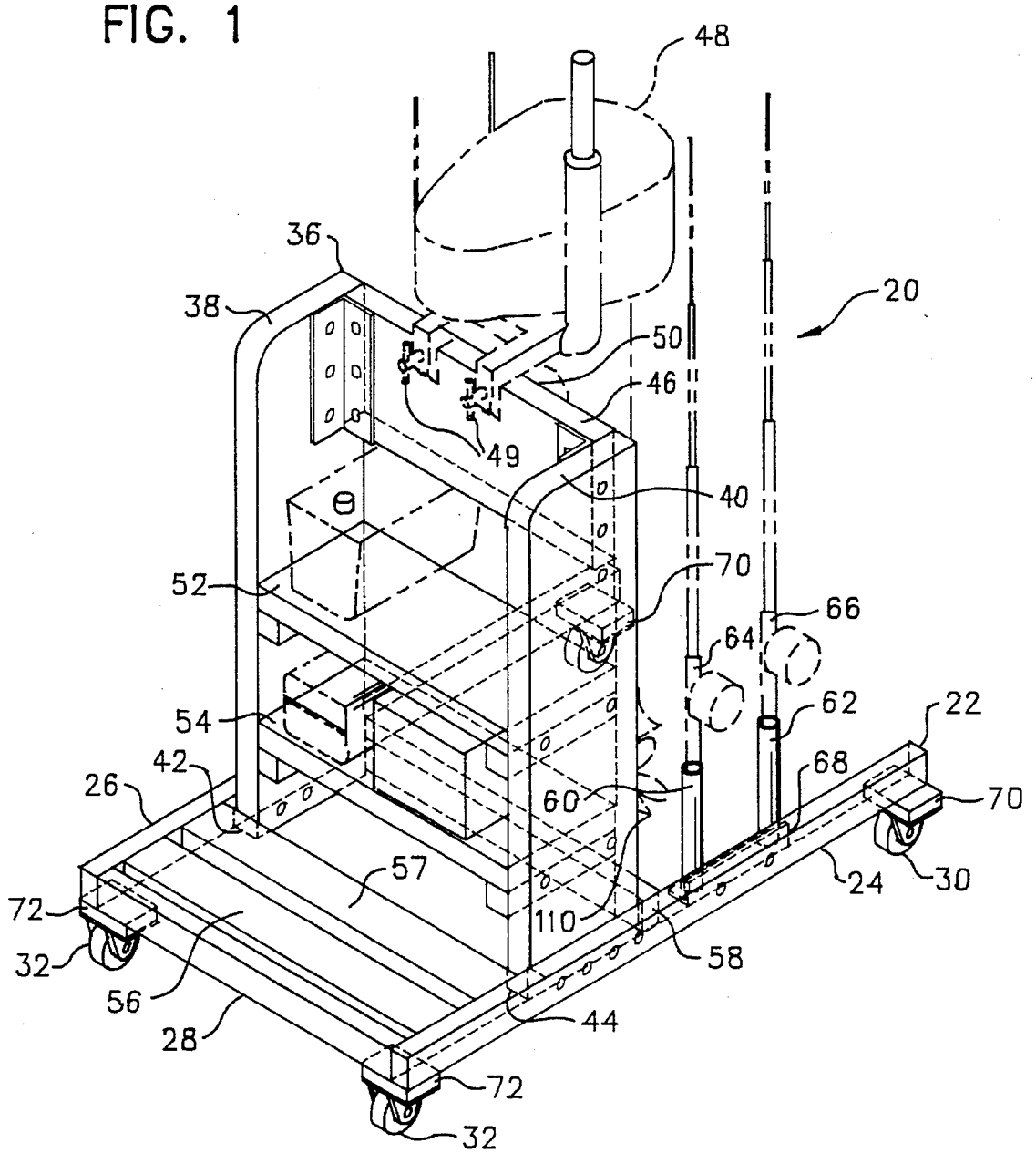
FIG. 1 is a perspective view of a first embodiment of an outboard motor transport stand embodying the principles of the present invention.

Referring now to FIG. 1, a perspective view of the outboard motor transport stand 20 is shown. The major components of outboard motor transport stand 20 are (a) a generally U-shaped base 22 having relatively narrow, elongate opposing side portions 24 and 26 and an elongate interior end portion 28, (b) front 30 (preferably swivel type) and rear 32 (preferably fixed track type) roller wheels to provide ease of movement for the base 22, and (c) a centrally disposed frame 36 between the two side portions 24 and 26 of the base 22.

Frame 36 has two opposing, upright members 38 and 40. Each of the members 38 and 40 has a bottom end, 42 and 44, respectively, each of which are affixed to one of the side portions 24 and 26 of the U-shaped base 22. A vertically disposed transom portion 46 extends transversely between at least a portion of the upright members 38 and 40. The transom portion 46 is suitable for receiving and affixing thereto an outboard motor 48, normally via clamps 49 found on the motor 48. The motor 48 is preferably received at the open side 50 of the transom portion 46; more particularly, the open side 50 of transom portion 46 is the side toward the open end of the U-shaped base 22. Also, one or more horizontal, transversely disposed storage shelves (here two shelves, 52 and 54 are shown) may be provided to extend between the opposing upright frame members 38 and 40.

Figure 3:
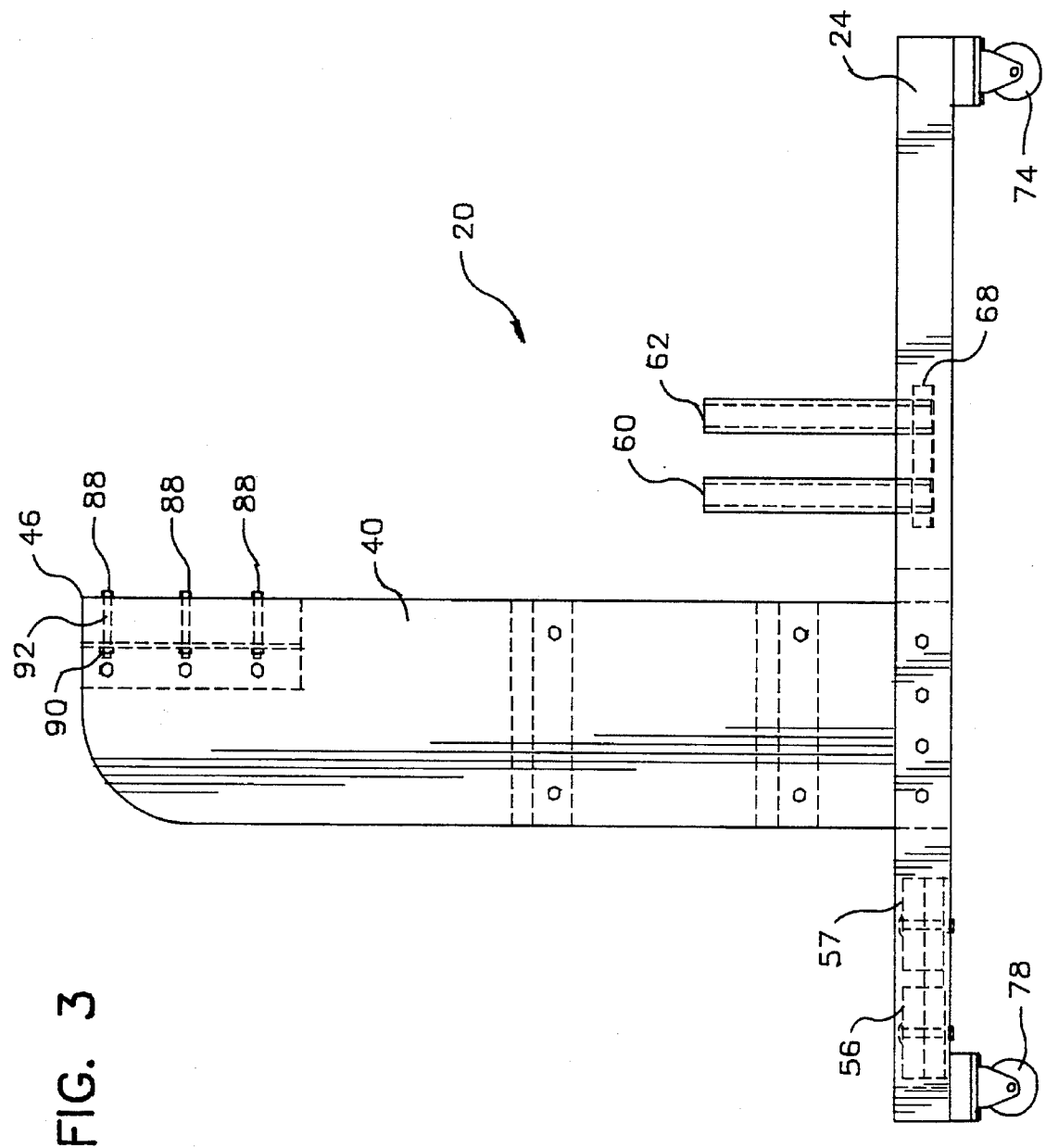
FIG. 3 is an elevation view of the transport stand shown in FIG. 2.

In a preferred embodiment, the base 22 has opposing side portions 24 and 26 and an elongate interior end portion 28 constructed of generally rectangular tubular type steel. The opposite side portions 24 and 26 may be parallel, but in any event are held in a spaced apart relationship by one or more supporting cross members, shown here as cross-members 56, 57, and 58. For strength, when tubular steel components are used as just mentioned above, the base 22, and cross member 58 are preferably welded together. As noted in FIG. 1, one or more vertically disposed tubular receptacles functioning as rod holders 60 and 62 may be provided, preferably affixed to base members 24 and/or 26, for holding fishing rods 64 and 66. I have found it convenient to provide the rod holders 60 and 62 in pairs, with one pair provided affixed to each of base members 24 and 26. Also, the rod holder 60 and 62 pairs are advantageously provided on an angle bracket 68 which is then affixed to base members 24 or 26. FIG. 3 provides a side elevation view of the embodiment just set forth.

Figure 2:
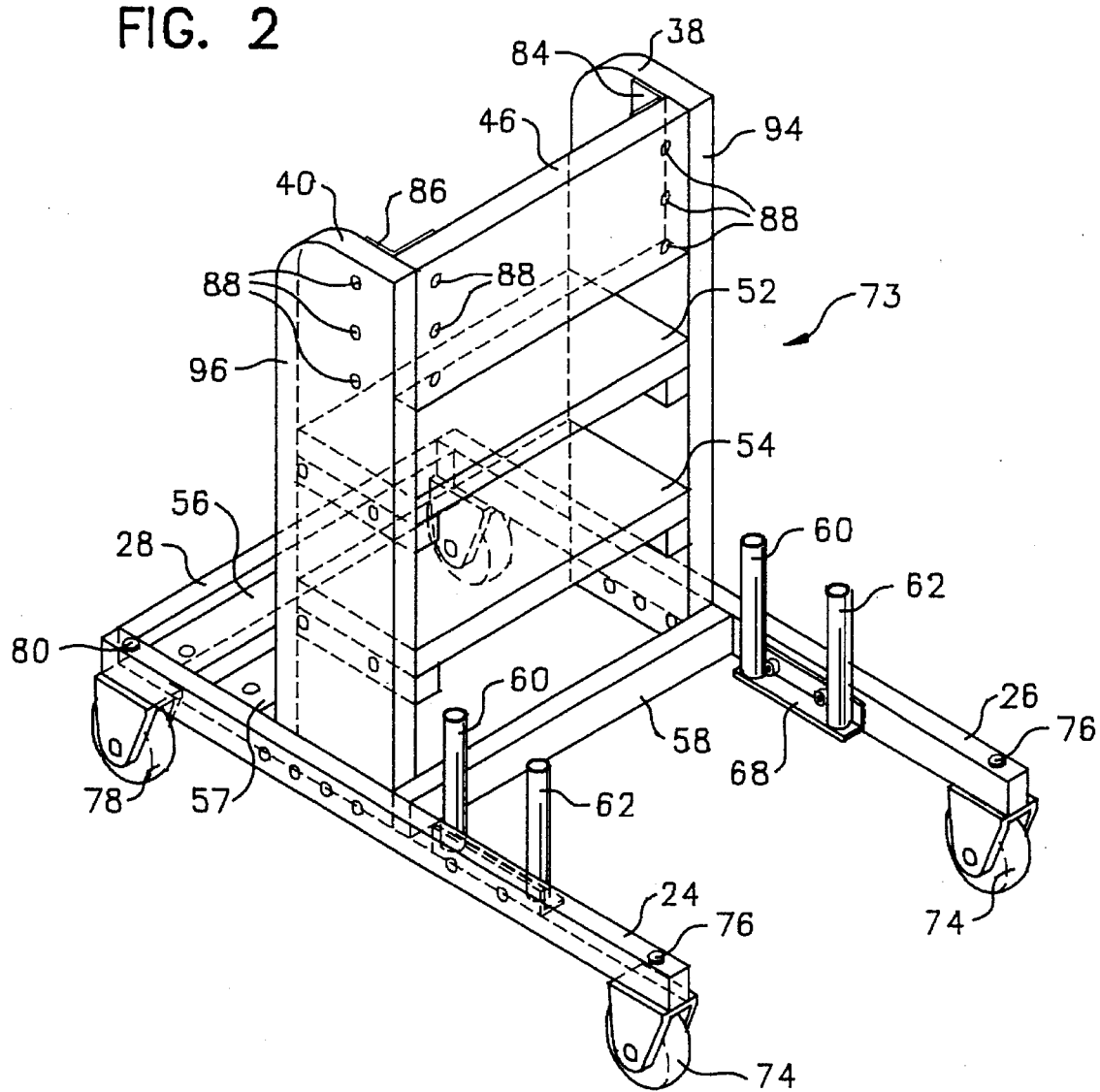
FIG. 2 is a perspective view of a second embodiment of the outboard motor transport stand, similar to the stand shown in FIG. 1.

A transport stand 73 with an alternate configuration is illustrated in FIG. 2. In the embodiment depicted in FIG. 2, the front roller wheels 74 are shown directly affixed to frame 22 via swivel type fasteners 76 that allow the front wheels 74 to pivot about a vertical axis. Rear wheels 78 are affixed to frame 22 via fasteners 80. Transport stand 72 is unlike the embodiment shown in FIG. 1, wherein the front roller wheels 30 and rear wheels 32 are attached to front and rear mounting blocks 70 and 72, respectively, which are in turn welded to the base 22.

Figure 4:
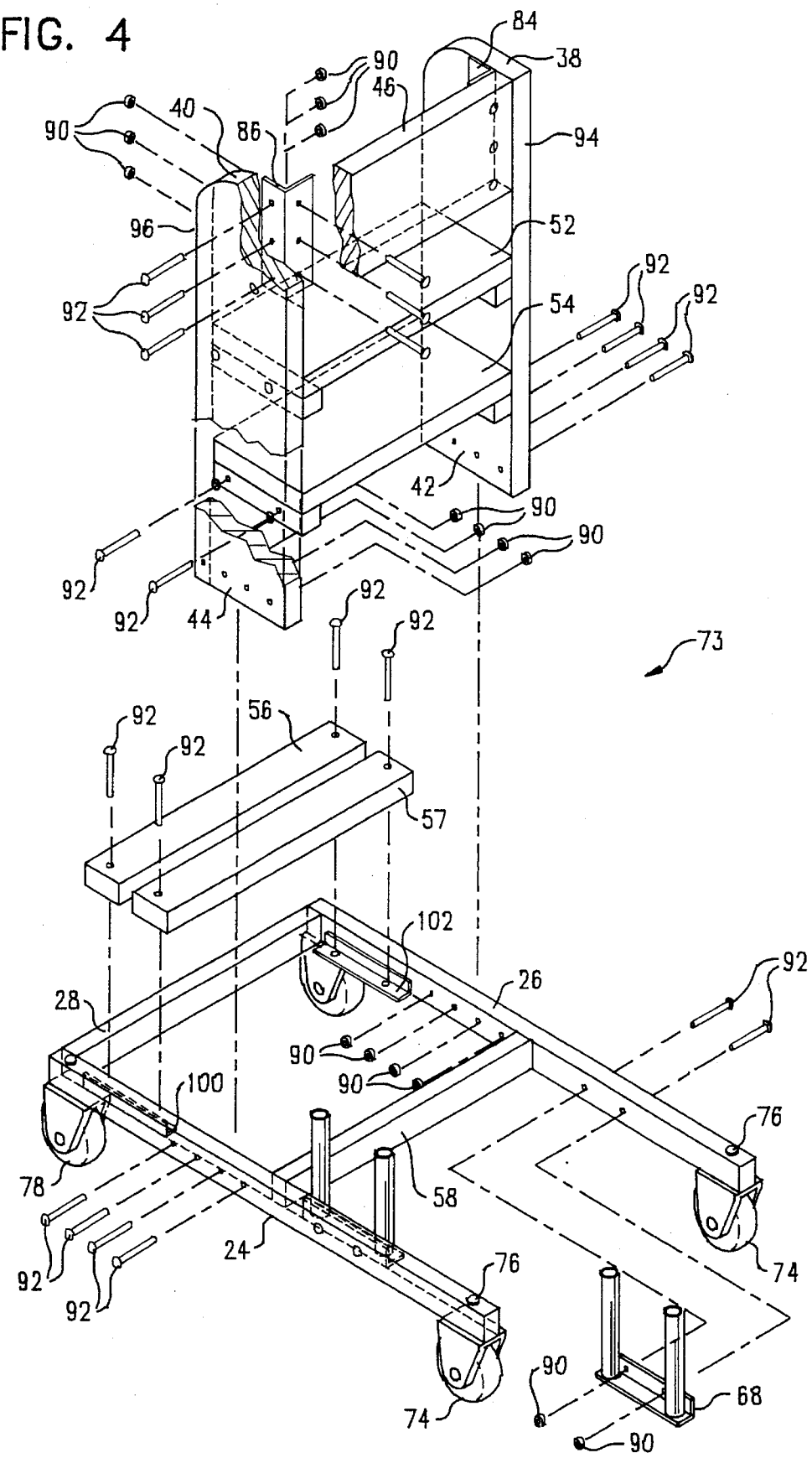
FIG. 4 is a partially exploded, partially broken away, view of the outboard motor transport stand first shown in FIG. 2 above.

As shown in FIGS. 2 and 4, the transom 46 may be affixed to upright members 38 and 40 of frame 36 via use of corner brackets 84 and 86 in conjunction with fastening systems 88, such as a nut 90 and bolt 92.

Frame 36 has two opposing, upright members 38 and 40. Each of the upright members 38 and 40 has a bottom end, 42 and 44, respectively, each of which are affixed to the corresponding side portions 24 and 26 of the U-shaped base 22. A generally vertically disposed transom portion 46 extends transversely between at least upper portions 94 and 96 of the upright members 38 and 40. The transom portion 46 is suitable for attachment of an outboard motor thereto.

Two shelves, 52 and 54, are provided. Shelves 52 and 54 are supported between the upright members 38 and 40. In a preferred embodiment, the spacing between upright members 38 and 40 is generally equal to the transverse dimension (width) of the shelves 52 and 54.

The space between the opposing side portions 24 and 26 of the U-shaped base 22 and outward from the transom 46 is preferably left open to facilitate attachment of an outboard motor 48 to the transom.

The supporting cross members 56 and 57 are provided affixed between elongate tubular members 24 and 26. The supporting cross members 56 and 57 are sufficiently strong to bear the weight of a person who might assist in loading the outboard motor 48 onto the transom 46. These cross members are best shown in FIG. 4, below, where it is seen that the cross members 56 and 57 may be bolted to angular support brackets 100 and 102 which are preferably welded to elongate members 24 and 26, respectively.

In the embodiment depicted in FIG. 1, the U-shaped base 22 of the outboard motor transport stand 20 will preferably have a width of about thirty (30) inches, and a wheelbase length of about forty eight (48) inches. Stand 20 will preferably have a height as measured from the top of transom 46 to the supporting surface below the wheels, sufficient to fully support a selected outboard motor 48 but not so high as to hold the lowest point 110 on the motor 48 more than about six (6) inches above the supporting surface.

Figure 5:
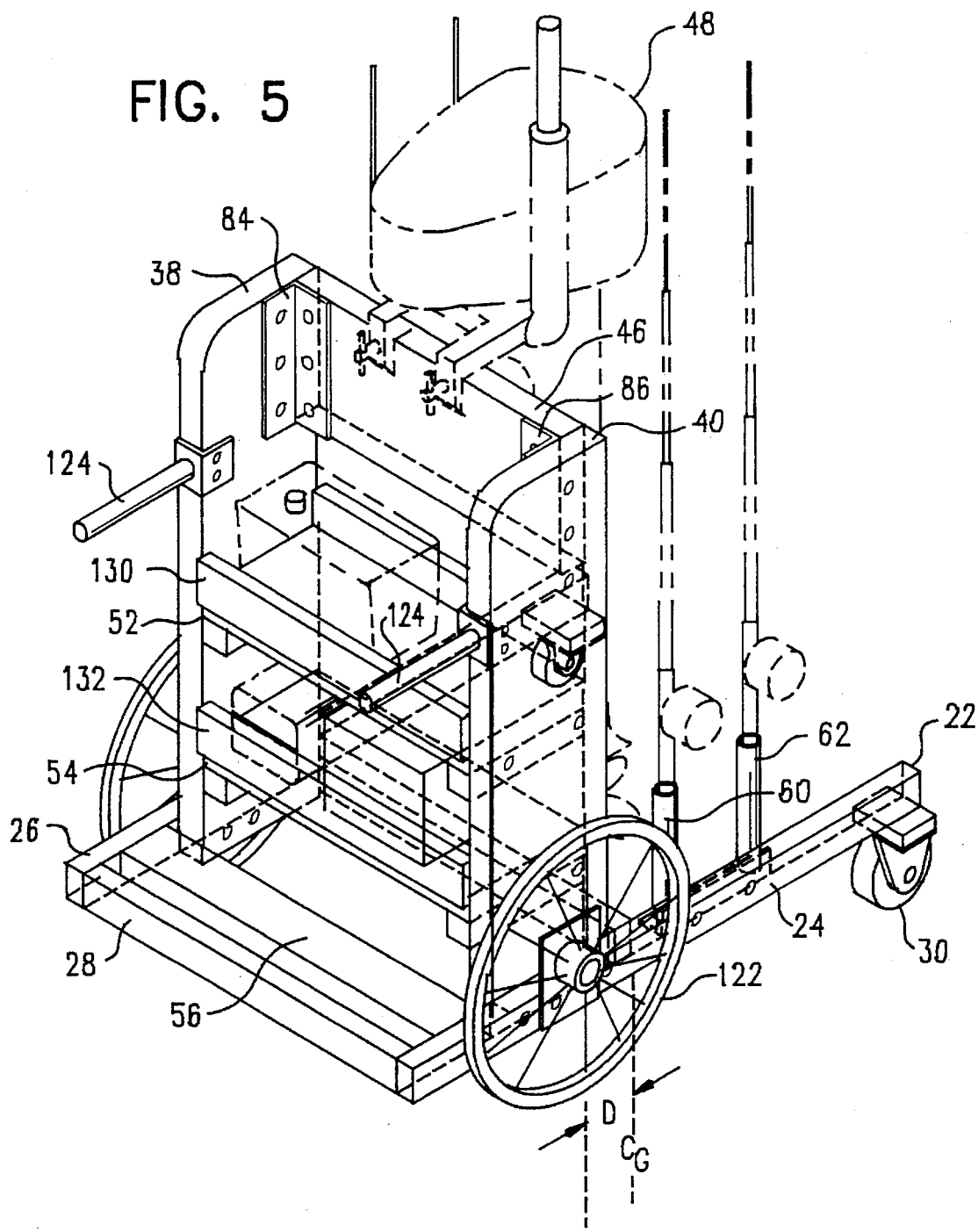
FIG. 5 is a perspective view of a third embodiment of the invention, utilizing a large wheel located below the central frame motor stand.

Yet another alternative embodiment of my invention is shown in FIG. 5. Transport stand 120 shown in this FIG. 5 is similar to the embodiment shown in FIG. 1, but large diameter wheels 122 have been substituted for the former rear wheels 32, and handles 124 have been added. the rear wheels 122 are of substantially larger diameter, on the order of three to four times, or more, than the front wheels 30 on stand 122. The larger diameter rear wheels 122 are affixed to the upright portions 38 and 40 of frame 36 at a location just rearward (such as distance D) of the center of gravity of the loaded stand 120, so that wheels 122 bear a majority of the weight of the motor 48 and stand 120. Preferably, wheels 122 are mounted with respect to an axis of rotation which is above the horizontal plane of U-shaped base 22.

Handles 124 are mounted on the upright members 38 and 40 of frame 36. Handles 124 are suitable for pushing and guiding the outboard motor transport stand. Additionally, retainers 130 and 132 are provided along the front of the shelves 52 and 54, respectively, to prevent any items such as tackle boxes or gas tanks which may be placed on the shelves from tending to slide off during movement of stand 120.

It will be readily apparent to the reader that the present invention may be easily adapted to other embodiments incorporating the concepts taught herein and that the present figures are shown by way of example only and not in any way a limitation. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalences of the claims are therefore intended to be embraced therein.

What is claimed is as follows:

1. A transport stand for carriage of a preselected outboard motor, said stand comprising:

(a) a base, said base comprising opposing elongate side portions and an elongate interior end portion arranged in a U-shape having an open end and a width along said elongate interior end portion suitable for locating an outboard motor therebetween;

(b) a frame, said frame comprising
  (i) a pair of opposing, generally vertically extending upright members, said upright members each having a bottom end, each of said bottom ends of said frame affixed at a preselected longitudinal position to one of said elongate side portions of said base, and
  (ii) a transom, said transom generally vertically disposed, and at least a portion of said transom located transversely between said opposing upright frame members, and affixed to both of said upright frame members, said transom suitable for attachment of an outboard motor thereto; and
  (iii) at least one shelf portion, said at least one shelf portion extending substantially horizontally between said opposing, generally vertically extending upright members;
(c) a pair of rearwardly facing handles, said rearwardly facing handles each affixed to one of said vertically extending upright members, said pair of rearwardly facing handles located so as to allow manipulation of said transport stand by application of force to said pair of reardwardly facing handles; and
(d) a first set of fixed roller wheels, said first set of fixed roller wheels affixed to said base at a position rearward by a distance D from a center of gravity $C_G$, so that when said transport stand is supporting an outboard motor, by slight downward application force to said pair of handles, said base may be raised to roll on said first set of fixed roller wheels, across a preselected substrate surface, to allow rolling movement of said transport stand.

2. The transport stand as set forth in claim 1, wherein said base is generally U-shaped so as to include an open end, and wherein said open end is of sufficient width to allow a preselected outboard motor to freely pass between said opposing elongate side portions as such preselected outboard motor is moved rearward toward said transom.

3. The transport stand as set forth in claim 2, wherein said U-shaped base further comprises at least one cross member, said cross member disposed between and affixed to each of said opposing elongate side portions of said U-shaped base.

4. The transport stand as set forth in claim 1, wherein said transom is affixed to said opposing upright frame members by brackets.

5. The transport stand as set forth in claim 1, further comprising a pair of swivel type roller wheels affixed near the distal end of each of said opposing elongate side portions of said U-shaped base.

6. The transport stand as set forth in claim 5, wherein said first set of wheels comprise a pair of fixed direction wheels attached to said base at approximately the same longitudinal position as said upright members of said frame.

7. The transport stand as set forth in claim 1, further comprising at least two storage shelf portions, said at least two storage shelf portions horizontally and transversely disposed between said opposing upright frame members.

8. A transport stand as defined in claim 1 wherein said base is comprised of rectangular steel tubing.

9. A transport stand as defined in claim 1, further comprising a vertically disposed tubular member, said tubular member affixed to one of said opposing side portions of said base, said tubular member adapted to receive and to hold fishing poles in an upright position.

10. A transport stand as defined in claim 2 wherein at least one of said cross members extends horizontally across said base so as to form a platform.

11. A transport stand as defined in claim 1 wherein said transom is vertically positioned at a height suitable to fully support said preselected outboard motor when said outboard motor is in an upright position so that the lowermost point of said outboard motor is not more than approximately six (6) inches above the surface which supports said stand and upon which surface said wheels traverse.

12. A transport stand as defined in claim 5 wherein said pair of fixed direction wheels are of substantially larger diameter when compared to said swivel direction wheels.

13. A transport stand as defined in claim 7 further comprising a vertically disposed retainer means mounted transversely between said upright members of said frame at a vertical position so as to prevent an object placed on said shelf from tending to escape outwardly from said shelf.

* * * * *